(No Model.) 2 Sheets—Sheet 1.

W. H. WORTH.
GRAPE STEMMER.

No. 358,241. Patented Feb. 22, 1887.

Witnesses,
Geo. H. Strong
J. H. Rourse

Inventor,
Wm. H. Worth,
By Dewey & Co.
Att'ys (No Model.)  2 Sheets—Sheet 2.

W. H. WORTH.
GRAPE STEMMER.

No. 358,241. Patented Feb. 22, 1887.

UNITED STATES PATENT OFFICE.

WILLIAM H. WORTH, OF PETALUMA, CALIFORNIA.

GRAPE-STEMMER.

SPECIFICATION forming part of Letters Patent No. 358,241, dated February 22, 1887.

Application filed November 23, 1886. Serial No. 219,723. (No model.)

*To all whom it may concern:*

Be it known that I, WILLIAM H. WORTH, of Petaluma, Sonoma county, State of California, have invented an Improvement in Grape-Stemmers; and I hereby declare the following to be a full, clear, and exact description of the same.

My invention relates to an improved device which is especially adapted for stripping grapes from their stems and discharging the grapes at the instant of separation and without crushing.

It consists of a horizontal revolving drum having spirally-arranged flanges projecting from its periphery, and an outer inclosing-case of the same shape having similar spiral flanges fixed within it, but at the reverse angle from those upon the drum, the flanges in both cases occupying upward of two-thirds of the circumference of the drum and case, and, in connection with these, of a longitudinal flange projecting from the side of the drum extending its whole length in the space not occupied by the flanges.

In connection with this stemming device, which has a discharge-opening at one end for the stems, I employ a hopper or chute to receive the separated grapes, and crushing-rollers which are operated in connection therewith.

Figure 1:
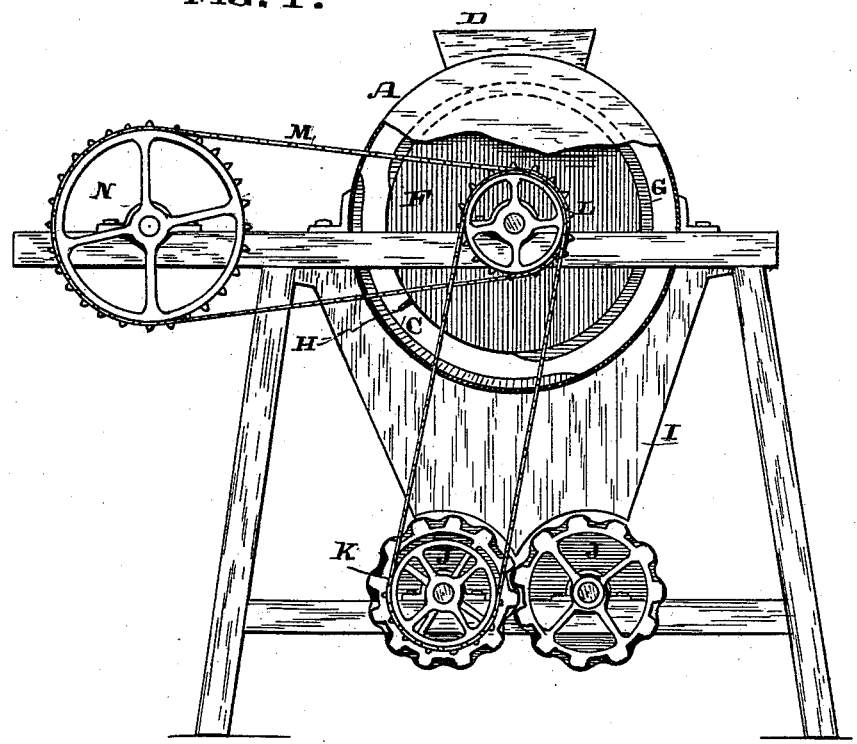
Figure 2:
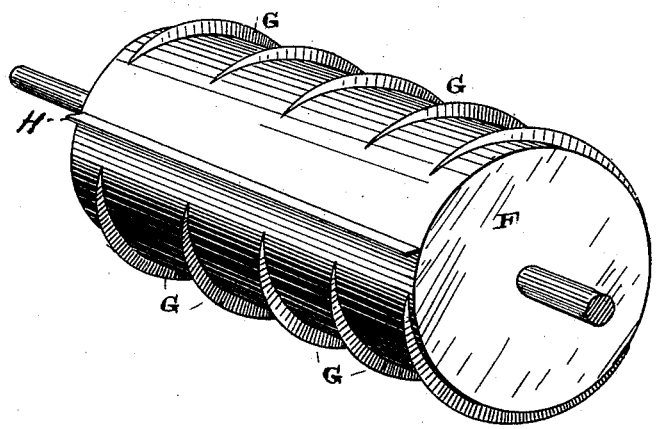
Figure 3:
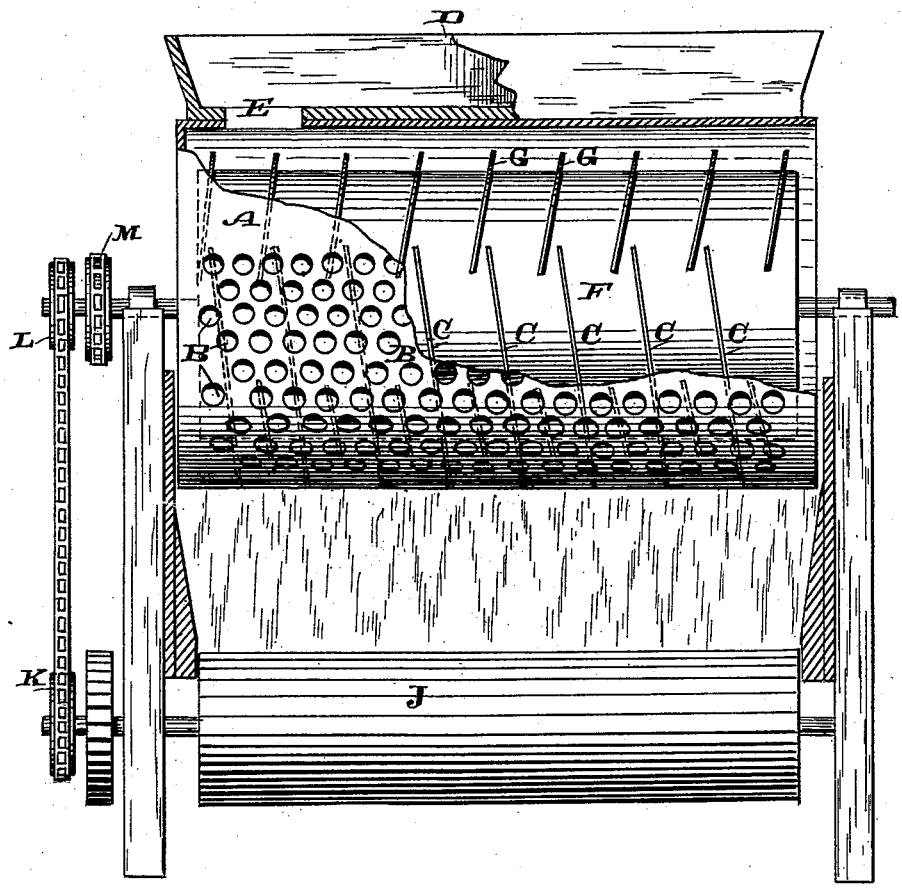

Referring to the accompanying drawings for a more complete explanation of my invention, Figure 1 is an end elevation of the apparatus and the mechanism for driving. Fig. 2 is a view of the drum with its spiral blades and longitudinal flange. Fig. 3 shows the exterior casing with its spiral flange and perforations.

Various devices are employed for separating grapes from their stems and discharging the stems and the grapes from the apparatus, consisting of projecting arms or pins upon a drum within a corrugated case, or one having adjustable blades situated upon one side, and spirals upon the drum alone have been employed; but none of these devices produce the result aimed at in my invention. The objection to these devices is that the grapes are crushed to a great extent in contact with the stems, and in many classes of grapes the stems are large and contain a great deal of tannin, which imparts a very strong and undesirable flavor to the juice expressed from the grapes.

My invention is designed to detach the grapes from the stems and immediately separate them therefrom with little or no crushing.

A is a cylindrical casing suitably supported in a horizontal position and having numerous holes or perforations, B, made so as to occupy about two-thirds of its circumference, leaving the remaining one-third near the top of the cylinder unperforated. Within this casing and between the holes or openings are fixed spirally-arranged flanges C, which project inwardly from the interior of the casing. These flanges terminate at about the same point with the holes, leaving the upper part of the casing smooth and clear of obstructions. Upon the top of this casing is placed a hopper or receiver, D, into which the grapes and stems are placed, and at one end an opening, E, is made, through which the grapes are fed into the cylinder as fast as may be desired. Within this casing is a cylinder or drum, F, having a shaft or axis by which it is rotated, this shaft being concentric with the axis of the casing, so that the cylinder rotates within the casing, leaving an equal space between it and the sides of the casing all around. Upon the circumference of this cylinder are fixed flanges G, spirally arranged and with the spirals in the opposite direction from those upon the interior of the casing. The edges of these spirals pass each other pretty closely and allow sufficient space between them for the stems of the grapes to be gradually worked toward the end of the casing opposite to that where the feed-opening of the hopper is located. The spiral flanges upon the surface of the drum occupy only about two-thirds of its circumference, in the same manner that the interior of the casing is constructed, leaving the remaining portion of the circumference of the drum without spiral flanges. In the central portion of this plain space is a straight blade or flange, H, projecting radially from the surface of the drum and extending longitudinally from one end to the other, as shown, so that it stands up about midway between the terminating ends of the flanges upon the drum.

The operation of the apparatus will then be as follows: The bunches of grapes, being fed into the opening E at one end of the apparatus, will be carried around by the drum, the straight flange H serving to turn them over and sweep them down along the sides of the drum and between it and the outer casing. The holes made through the sides of the outer casing are large enough to allow the grapes to project and pass through, and they are held by this means, while the double spiral flanges act to strip the stems from the grapes, the latter falling immediately outside of the cylinder through the holes and without further contact with the stems. The bunches are carried around by the spiral blades and the longitudinal flange, so as to be passed around within the casing, being gradually moved toward the discharge or open end of the casing at the same time, and as they are rolled or turned over by the action of the longitudinal flange upon the drum all the grapes upon the stems will be forced through the holes in the outer casing and discharged, so that when the stems reach the end of the casing they will be discharged entirely clear of the grapes, and will not carry any amount of skins or pulp with them, as would be the case if the grapes were partially crushed within the stemming apparatus. By this means I separate the grapes from the stems immediately upon their being detached, and they fall thence through the sides of the casing into an exterior hopper, I, which extends up on each side of the casing to receive them and convey them down to the crushing-rolls J beneath. These rolls are made in any ordinary or desirable form, usually fluted, for the purpose of crushing the grapes, and they are caused to rotate toward each other by means of gear-wheels fixed upon the outer ends of their shafts. Upon the end of one of these shafts is a chain-pulley, K, and a chain extends from it to a similar pulley, L, upon the end of the drum-shaft of the stemmer, so that motion will be applied to drive the crushing-rolls in this manner. Another chain pulley is fixed upon the drum-shaft, and a second chain, M, extends from this pulley to the pulley N, from which power is derived to drive the whole apparatus.

I do not claim any special combination, however, between the stemming and crushing apparatus, as these arrangements are in common use.

Having thus described my invention, what I claim as new, and desire to secure by Letters Patent, is—

1. A grape-stemmer consisting of an exterior casing having spirally-arranged flanges around its interior and openings or perforations between these flanges sufficiently large to allow the grapes to protrude and escape, in combination with a concentrically-journaled drum having similar spiral flanges around a portion of its periphery standing at an opposite angle from those within the casing, substantially as herein described.

2. The exterior casing having spiral flanges arranged around its interior circumference and extending around the larger portion, so as to leave a plain space at the top, with similarly-arranged holes or perforations through the sides between the flanges, in combination with a concentrically-arranged rotating drum having oppositely-arranged spiral flanges around a portion of its circumference, and a longitudinal flange projecting from the surface of the drum into the space between the ends of the spiral flanges, substantially as herein described.

3. The horizontal casing having one end open for discharging the stems, a hopper and feed-opening upon the top of the casing, and spiral flanges and intermediate holes or openings extending from the bottom to a point near the top of the casing upon each side, in combination with a concentrically-arranged rotating drum having oppositely-arranged spiral flanges upon its periphery occupying the larger portion of its circumference, and a longitudinal plate or flange extending from end to end of the drum in the space between the ends or terminations of the spiral flanges upon the same, substantially as herein described.

4. The horizontally-placed casing having the feed hopper and opening, spiral flanges and perforations and discharge-opening at the end opposite to the feed-opening, an interior concentric rotating drum having spiral flanges, and a longitudinal plate, as shown, in combination with a hopper or receiver embracing the sides of the exterior casing, and crushing-rolls into which the lower end of the receiver discharges, said rolls and drum being driven from a common source of power by chain belts, substantially as herein described.

In witness whereof I have hereunto set my hand.

W. H. WORTH.

Witnesses:
S. H. NOURSE,
H. C. LEE.